US010687406B2

(12) United States Patent
Nimmer

(10) Patent No.: US 10,687,406 B2
(45) Date of Patent: Jun. 16, 2020

(54) LIGHTING ELEMENT WITH INTEGRATED WIRELESS COMMUNICATION, CONTROL, AND MOTION SENSING CAPABILITY

(71) Applicant: James Andrew Nimmer, Minooka, IL (US)

(72) Inventor: James Andrew Nimmer, Minooka, IL (US)

( * ) Notice: Subject to any disclaimer, the term of this patent is extended or adjusted under 35 U.S.C. 154(b) by 0 days.

(21) Appl. No.: 16/292,577

(22) Filed: Mar. 5, 2019

(65) Prior Publication Data

US 2019/0274205 A1    Sep. 5, 2019

Related U.S. Application Data

(60) Provisional application No. 62/638,532, filed on Mar. 5, 2018.

(51) Int. Cl.
| | | |
|---|---|---|
| *H05B 47/19* | (2020.01) | |
| *H04B 1/38* | (2015.01) | |
| *H05B 45/00* | (2020.01) | |
| *H05B 47/105* | (2020.01) | |

(52) U.S. Cl.
CPC ............. *H05B 47/19* (2020.01); *H04B 1/38* (2013.01); *H05B 45/00* (2020.01); *H05B 47/105* (2020.01)

(58) Field of Classification Search
CPC ... H05B 37/0272; H05B 37/0227; H04B 1/38
USPC ........................................................ 315/158
See application file for complete search history.

(56) References Cited

U.S. PATENT DOCUMENTS

| | | | |
|---|---|---|---|
| 2007/0109763 A1 | 5/2007 | Wolf et al. | |
| 2009/0315485 A1* | 12/2009 | Verfuerth | ........... H05B 37/0272 315/320 |
| 2010/0201267 A1 | 8/2010 | Bourquin et al. | |
| 2012/0143383 A1* | 6/2012 | Cooperrider | ............ H04Q 9/00 700/295 |
| 2012/0274222 A1* | 11/2012 | Verfuerth | ........... H05B 37/0227 315/158 |
| 2013/0261774 A1 | 10/2013 | Lu et al. | |

(Continued)

OTHER PUBLICATIONS

International Search Report and Written Opinion for International Application No. PCT/US2019/020776 dated May 17, 2019, 9 pages.

*Primary Examiner* — Don P Le
(74) *Attorney, Agent, or Firm* — Husch Blackwell LLP

(57) ABSTRACT

Systems and methods are provided relating to a smart lightbulb that can comprise means to sense motion and means to wirelessly transmit and receive information. The smart lightbulb can include a radio frequency transceiver and a motion sensor having an antenna. The transceiver and motion sensor can be electrically coupled to a programmable processor. The transceiver can be oriented in a first plane and the antenna of the motion sensor can be oriented in a second plane different than the first plane. In some embodiments, an oscillator circuit can be provided in place of the motion sensor antenna. The oscillator circuit can be electrically coupled to the transceiver, the motion sensor, and communication circuitry. The programmable processor can be configured to direct the oscillator circuit to switch between electrically coupling the motion sensor to the radio frequency transceiver and electrically coupling the communication circuitry to the radio frequency transceiver.

19 Claims, 5 Drawing Sheets

(56) References Cited

U.S. PATENT DOCUMENTS

| | | | |
|---|---|---|---|
| 2014/0139116 A1* | 5/2014 | Reed | H05B 33/0854 |
| | | | 315/153 |
| 2016/0255697 A1* | 9/2016 | Bhide | H02J 9/06 |
| | | | 315/161 |
| 2016/0323956 A1* | 11/2016 | Mathews | H05B 33/0854 |
| 2017/0245347 A1 | 8/2017 | Zhou et al. | |
| 2018/0035518 A1 | 2/2018 | Cook | |
| 2018/0063391 A1 | 3/2018 | Megginson et al. | |
| 2018/0180234 A1* | 6/2018 | Spiro | F21V 29/74 |

* cited by examiner

LIGHTING ELEMENT WITH INTEGRATED WIRELESS COMMUNICATION, CONTROL, AND MOTION SENSING CAPABILITY

CROSS REFERENCE TO RELATED APPLICATIONS

This application claims priority to U.S. Provisional Patent Application No. 62/638,532 filed Mar. 5, 2018 and titled "LIGHTING ELEMENT WITH INTEGRATED WIRELESS COMMUNICATION, CONTROL, AND MOTION SENSING CAPABILITY." U.S. Provisional Patent Application No. 62/638,532 is hereby fully incorporated by reference as if set forth fully herein.

FIELD

Embodiments presented herein generally pertain to a lighting element for providing an artificial source of light, and more specifically to an apparatus, control system and method for a replaceable type lamp light source such as a smart lightbulb providing an integrated design that can comprise means to sense motion, means to wirelessly transmit and receive information to and from remote devices, an element or plurality of elements used to emit light, and a means to limit power to said lighting element(s).

BACKGROUND

For typical automation applications, two main types of motion sensing technology are generally used; passive infrared (PIR) sensors and Microwave sensors. PIR sensors detect infrared energy emitted from body heat and are generally immune to RF interference. However, when in close proximity to sources of heat, such as LED lighting elements, PIR sensors can malfunction and the range and effectiveness of motion detection capability can be severely limited. Microwave sensors emit pulses of low energy microwave signals and measure the reflection off of moving objects. Microwave sensors are generally immune to temperature changes but when in close proximity to RF emitting devices used for wireless communication, interference with the emitted and reflected signals can occur, causing unreliable operation. Due to the inherent limitations of both motion sensing technologies, existing systems for lighting and home/industrial automation are typically comprised of multiple devices dedicated to single functions such as devices for lighting control and devices for motion sensing. Other devices exist that contain both lighting control and motion sensing but do not contain the ability to communicate wirelessly to remote devices.

With considering the above mentioned, there is a need for a device that can provide means of motion sensing, lighting control, and wireless communication coexisting within a single unit.

DETAILED DESCRIPTION

Embodiments of the subject invention can be presented in many different forms. It will be recognized and understood by persons of ordinary skill in the art that the specific embodiments disclosed and illustrated below are exemplary and not intended to specifically limit the invention to any one particular configuration, arrangement or design. A replaceable type lamp light source will be referred to hereafter as a "lightbulb" with embodiments being referred to hereafter as a "motion sensing smart lightbulb." According to exemplary embodiments of the subject invention, a motion sensing smart lightbulb is provided which can use microwave or similar motion sensing technology. Generally, embodiments of the subject invention utilize novel design features, operations and methods which have been proven through testing to mitigate the interference problem mentioned above between a motion sensor and RF transceiver.

Figure 1:
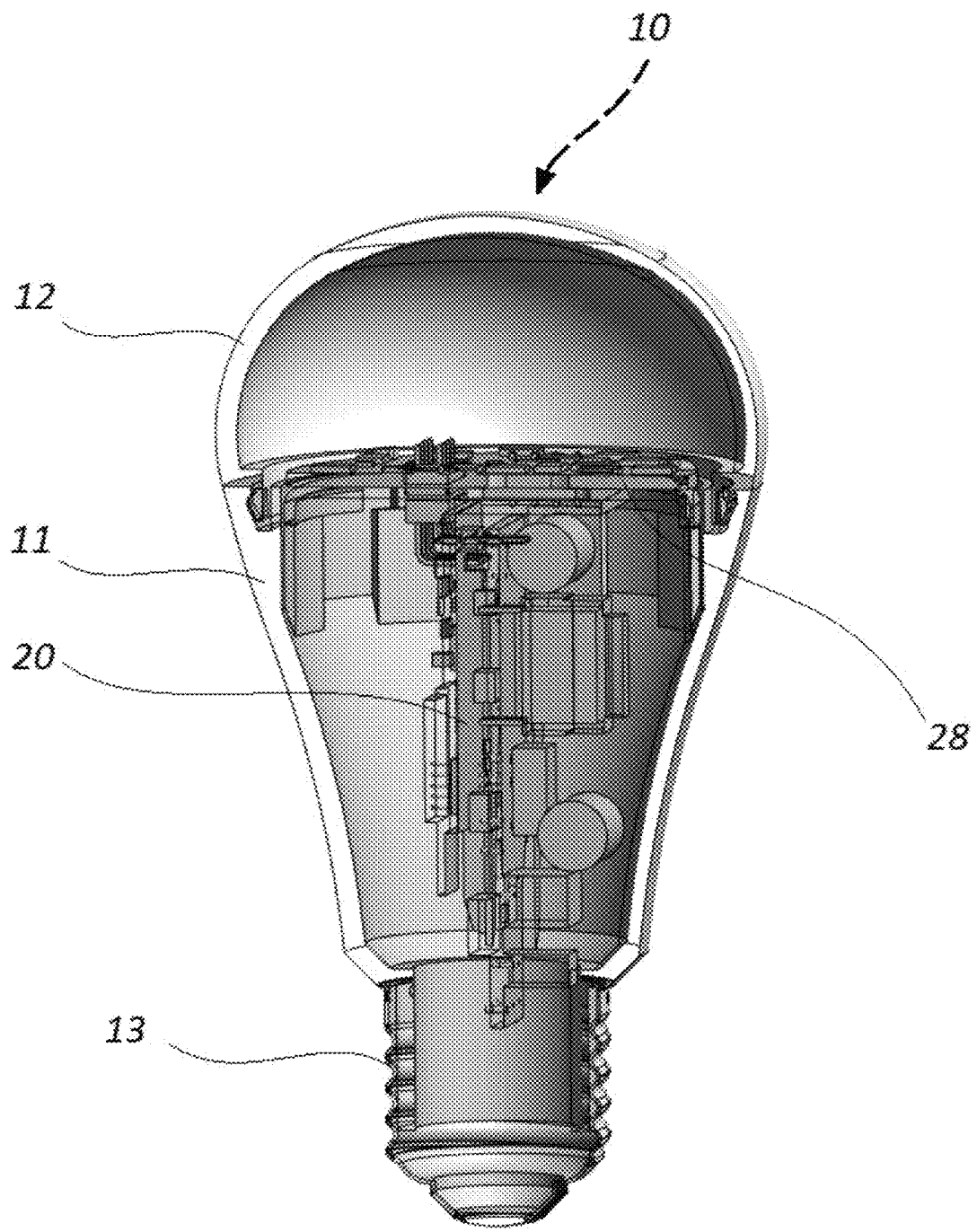
FIG. 1 is a diagram of a motion sensing smart lightbulb according to an exemplary embodiment.

FIG. 1 is a perspective view of a motion sensing smart lightbulb 10 according to an exemplary embodiment. As shown schematically in FIG. 1, the smart lightbulb 10 can have an integrated one-piece design having a housing 11 with a light permeable bulb portion 12 and integral base portion 13 enclosing a lighting source 28 (e.g. light emitting diode circuit board) integrated into a circuit board assembly 20. As shown in FIG. 1, the integral base portion 13 can include an electrical contact configured to connect the smart lightbulb 10 to an electric lighting device such as a lamp or light fixture.

Figure 2:
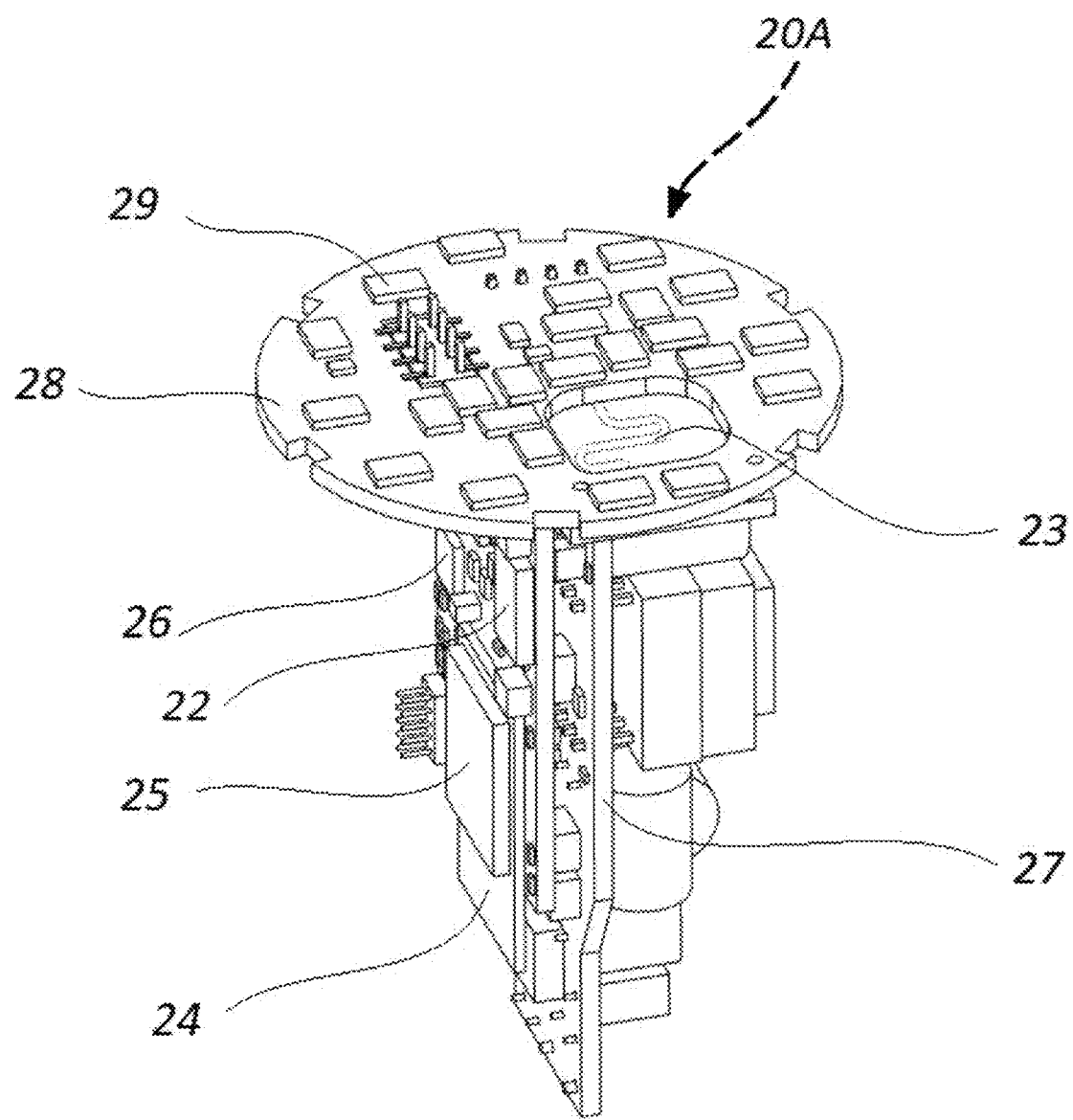
FIG. 2 is a perspective view of internal components of a motion sensing smart lightbulb according to an exemplary embodiment.

FIG. 2 is a perspective view of a circuit board assembly 20A for use in the motion sensing smart lightbulb 10 according to an exemplary embodiment. As shown in FIG. 2, the circuit board assembly 20A can include the lighting source 28 with a light emitting diode or plurality of light emitting diodes 29, a motion sensor 22, a motion sensor antenna 23, a radio frequency transceiver 24, communication circuitry 25, a programmable processor 26 (e.g. microprocessor or microcontroller), and a power supply and LED driver circuitry 27. As shown in FIG. 2, the radio frequency transceiver 24 can be electrically coupled to the communication circuitry 25 and the programmable processor 26 and positioned oriented in a first plane. Similarly, the motion sensor 22 can be electrically coupled to the programmable processor 26, the motion sensor antenna 23 can be oriented in a second plane different than the first plane to limit interference between the antenna and the radio frequency transceiver 24. In some embodiments, the first plane can be perpendicular to the second plane. Additionally or alternatively, in some embodiments, the radio frequency transceiver 24 and the motion sensor antenna 23 can be separated by a distance. In some embodiments the distance can be greater than or equal to 2 inches which has been shown to effectively mitigate interference between the motion sensor antenna 23 and the radio frequency transceiver 24.

In operation, according to embodiments disclosed herein, the programmable processor 26 can be configured for implementing instructions (e.g. software) stored on a transitory or nontransitory computer-readable storage medium (e.g. memory). For example, in some embodiments, the programmable processor 26 can be configured to connect to a first wireless network via the radio frequency transceiver 24 and the communication circuitry 25. Additionally, the motion sensor 22 can be configured to detect a presence of motion in an area proximate to a location of the smart lightbulb 10 using the motion sensor antenna 23, and responsive thereto, the programmable processor 26 can be configured to alter a state of the lighting source 28 and broadcast signals indicative of the presence of the motion over the first network.

In some embodiments, the programmable processor 26 can be configured to alter the state of the lighting source 28 based on information received in signals from the first wireless network. In some embodiments, the state of the lighting source 28 can include an 'ON' state where the lighting source 28 is activated at a constant default brightness or an 'OFF' state where the lighting source 28 is deactivated. The state of the lighting source 28 can also include a constant brightness state where the lighting source 28 is set to a specific constant brightness level in response to the signals from the first wireless network and/or a constant color state where the lighting source 28 is set to a specific constant color output option in response to the signals from the first wireless network. The state of the lighting source 28 can also include a strobing state where the lighting source 28 flashes on and off, a periodic color changing state where the lighting source 28 transitions between different output color options, and/or a periodic brightness changing state where the lighting source 28 periodically changes the brightness of light output from the lighting source 28.

In some embodiments, the programmable processor 26 can be configured to create a second wireless network via the radio frequency transceiver 24 and the communication circuitry 25. In some embodiments, the second wireless network can enable the smart lightbulb 10 to act as either a main hub or a room hub for connecting other smart lightbulbs to the first wireless network. In some embodiments, the programmable processor 26 can be configured to alter the state of the lighting source 28 based on information received in signals from the second wireless network and, when the motion sensor 22 detects the presence of the motion, the programmable processor 26 can be configured to broadcast the signals indicative of the presence of the motion over the second network. In some embodiments, the programmable processor 26 can be configured to rebroadcast the signals received over the second wireless network over the first network. Various network typologies for the first wireless network and the second wireless network are contemplated. Such typologies can include the User Datagram Protocol (UDP). Using the UDP protocol can allow the smart lightbulb 10 and other smart lightbulbs connected to the first network or the second network to transmit and receive signals over the first network and/or the second network without having to maintain a persistent connection thereto.

Figure 3:
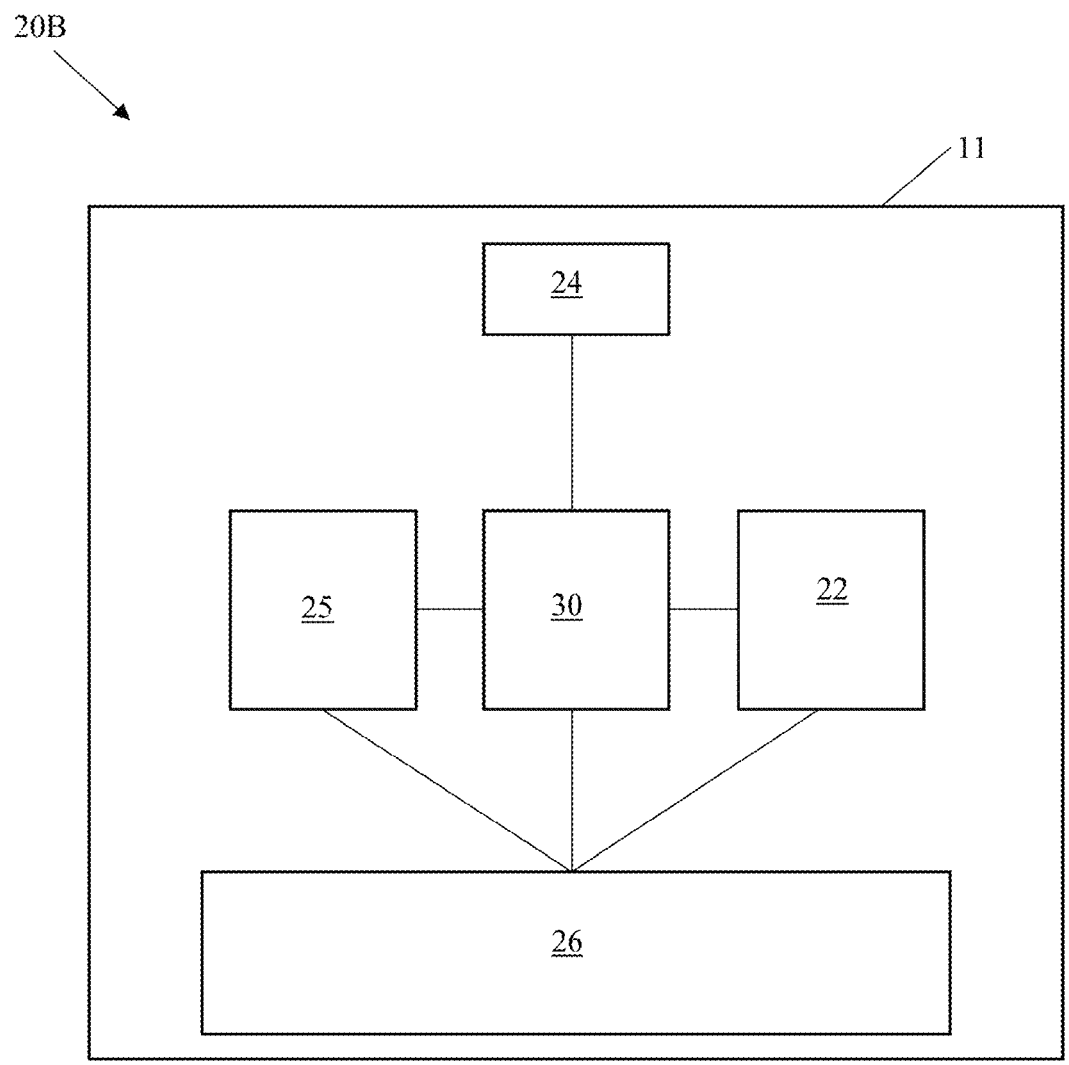
FIG. 3 is a block diagram of internal components of a motion sensing smart lightbulb according to an exemplary embodiment.
Figure 4:
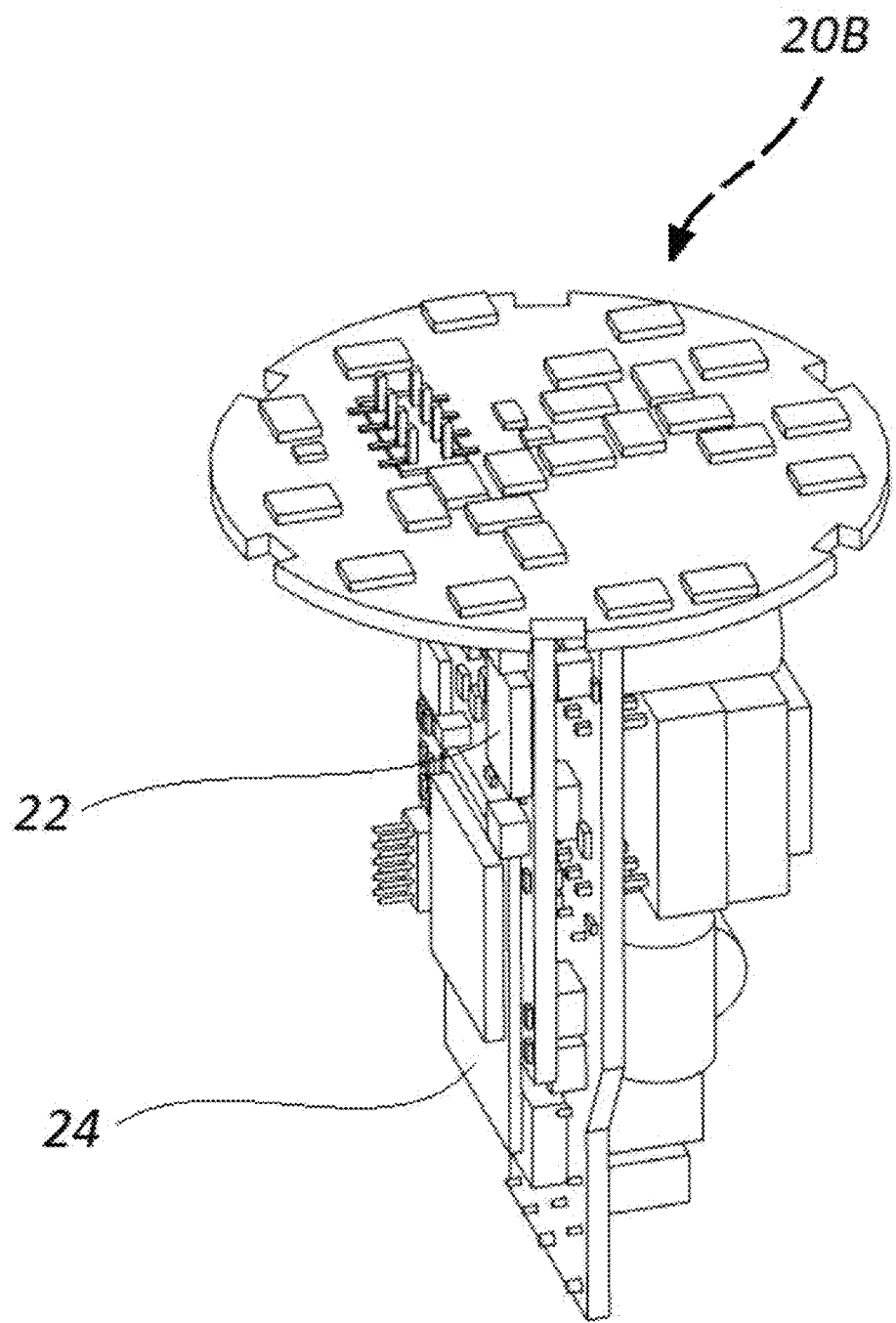
FIG. 4 is a perspective view of internal components of a motion sensing smart lightbulb according to an exemplary embodiment.

FIG. 3 is block diagram for a circuit board assembly 20B and FIG. 4 is a perspective view of the circuit board assembly 20B for use in the motion sensing smart lightbulb 10 according to an exemplary embodiment. As shown in FIG. 3 and FIG. 4, the circuit board assembly 20B can be similar to the circuit board assembly 20A of FIG. 2. However, the circuit board assembly 20B can be provided without a motion sensor antenna 23 and can include an oscillator circuit 30. As shown in FIG. 3 and FIG. 4 in some embodiments, the oscillator circuit 30 can be electrically coupled to the programmable processor 26, the radio frequency transceiver 24, the motion sensor 22, and the communication circuitry 25.

In operation, the motion sensor 22 of the circuit board assembly 20B can be tuned to operate in a frequency of the radio frequency transceiver 24 and can use the radio frequency transceiver 24 to detect motion in the area proximate to the smart light bulb 10. Furthermore, the programmable processor 26 can be configured to direct the oscillator circuit 30 to switch between electrically coupling the motion sensor 22 to the radio frequency transceiver 24 or electrically coupling the communication circuitry 25 to the radio frequency transceiver. In some embodiments, the programmable processor 26 can be configured to periodically direct the oscillator circuit 30 to switch between electrically coupling the motion sensor 22 to the radio frequency transceiver 24 or electrically coupling the communication circuitry 25 to the radio frequency transceiver 24.

In some embodiments, the operations described in connection with the circuit board assembly 20A of FIG. 2 can be executed by the circuit board assembly 20B dependent upon which device the radio frequency transceiver 24 is coupled to. For example, when the oscillator circuit 30 electrically couples the communication circuitry 25 to the radio frequency transceiver 24, the programmable processor 26 can be configured to use the communication circuitry 25 to connect to the first wireless network via the radio frequency transceiver 24 and create the second wireless network via the radio frequency transceiver 24. Similarly, when the oscillator circuit 30 electrically couples the motion sensor 22 to the radio frequency transceiver 24, the motion sensor 22 can be configured to detect the presence of motion. In some embodiments, responsive to the motion sensor 22 detecting the presence of motion, the programmable processor 26 can be configured to direct the oscillator circuit 30 to electrically couple the communication circuitry 25 to the radio frequency transceiver 24 so that the programmable processor 26 can use the communication circuitry 25 to broadcast the signals indicative of the presence of the motion over the first network or the second network.

Figure 5:
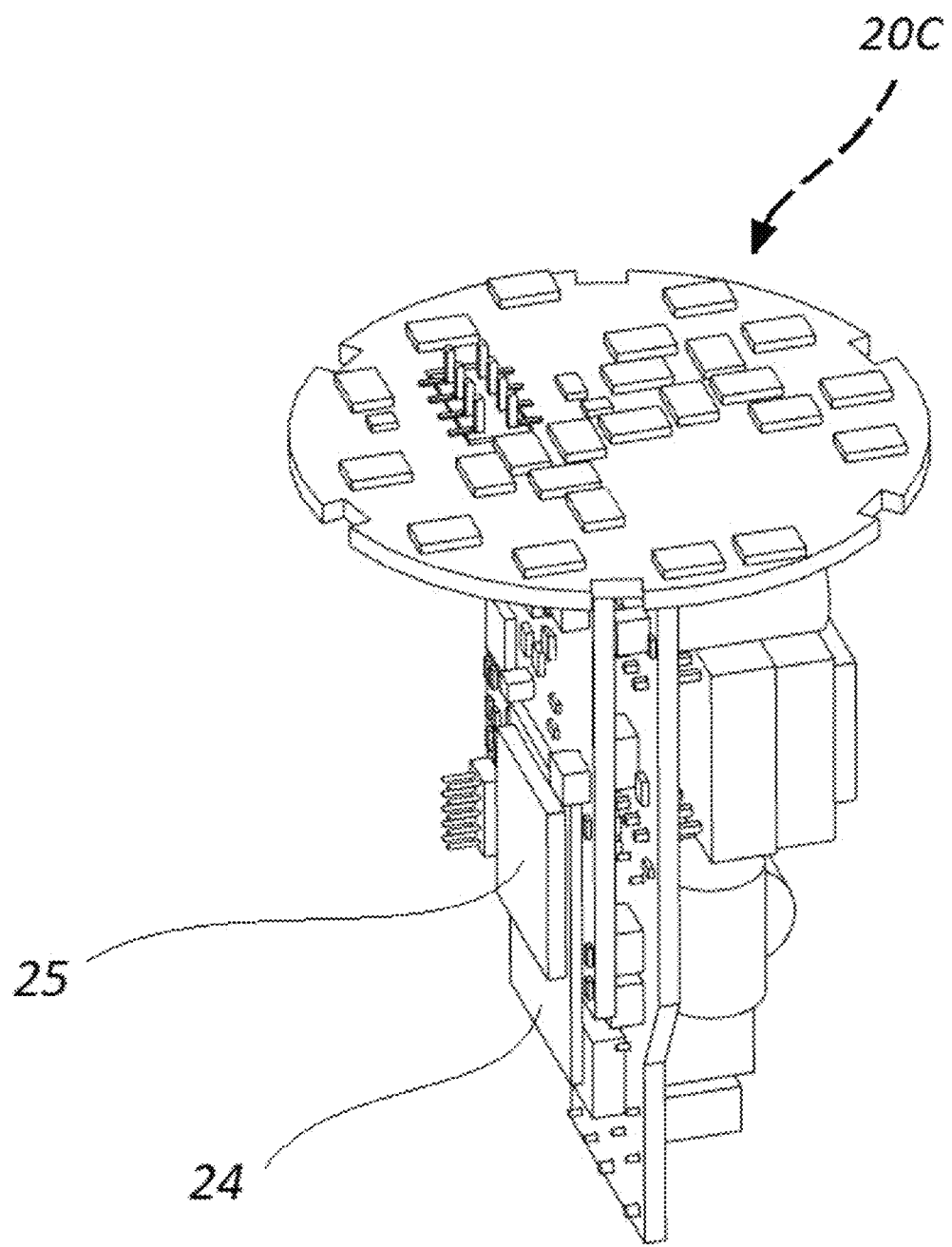
FIG. 5 is a perspective view of internal components of a motion sensing smart lightbulb according to an exemplary embodiment.

FIG. 5 is a perspective view of a circuit board assembly 20C for use in the motion sensing smart lightbulb 10 according to an exemplary embodiment. As shown schematically in FIG. 5 the circuit board assembly 20C can be similar to the circuit board assembly 20A of FIG. 2 and the circuit board assembly 20B of FIG. 3 and FIG. 4. However, the circuit board assembly 20C can be provided without the motion sensor 22. Instead, the circuit board assembly 20C can use a software-based solution implemented in the communication circuitry 25 and/or the programmable processor 26 to replace the functions of the motion sensor 22 as described herein. In particular, the communication circuitry 25 and/or the programmable processor 26 can utilize the radio frequency transceiver 24 to emit pulses of low energy signals (e.g. microwave signals or Wi-Fi signals) to detect the motion.

Although certain selected exemplary embodiments have been described in detail above, other embodiments with modifications to the foregoing components, structure or operation are within the scope of the subject invention. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A smart lightbulb comprising:
a light source;
a programmable processor;
a radio frequency transceiver electrically coupled to the programmable processor and oriented in a first plane; and
a motion sensor electrically coupled to the programmable processor and having an antenna oriented in a second plane different than the first plane,
wherein the programmable processor is configured to connect to a first wireless network via the radio frequency transceiver,
wherein the programmable processor is configured to alter a state of the light source based on first information received in first signals from the first wireless network,
wherein, the motion sensor is configured to detect a presence of motion in an area proximate to a location of the smart lightbulb, and
wherein, responsive to the motion sensor detecting the presence of the motion, the programmable processor is configured to alter the state of the light source and broadcast second signals indicative of the presence of the motion over the first network.

2. The smart lightbulb of claim 1 wherein the radio frequency transceiver and the antenna are separated by a distance.

3. The smart lightbulb of claim 2 wherein the distance is greater than or equal to 2 inches.

4. The smart lightbulb of claim 1 wherein the first plane is perpendicular to the second plane.

5. The smart lightbulb of claim 1 wherein the programmable processor is configured to create a second wireless network via the radio frequency transceiver,
wherein the programmable processor is configured to alter the state of the light source based on second information received in third signals from the second wireless network, and
wherein, when the motion sensor detects the presence of motion in the area proximate to the location of the smart lightbulb, the programmable processor is configured to broadcast the second signals indicative of the presence of the motion over the second network.

6. The smart lightbulb of claim 5 wherein the programmable processor is configured to rebroadcast the third signals over the first network.

7. The smart lightbulb of claim 1 wherein the state of the light source comprises at least one of an on state, an off state, a constant brightness state of the light source, a constant color state of the light source, a strobing state of the light source, a periodic color changing state of the light source, or a periodic brightness changing state of the light source.

8. A smart lightbulb comprising:
a light source;
a programmable processor;
communication circuitry electrically coupled to the programmable processor;
a radio frequency transceiver;
a motion sensor electrically coupled to the programmable processor, the motion sensor being configurable for operation in a same frequency as the radio frequency transceiver; and
an oscillator circuit electrically coupled to the programmable processor, the radio frequency transceiver, the motion sensor, and the communication circuitry,
wherein the programmable processor is configured to direct the oscillator circuit to switch between electrically coupling the motion sensor to the radio frequency transceiver and electrically coupling the communication circuitry to the radio frequency transceiver,
wherein, when the oscillator circuit electrically couples the communication circuitry to the radio frequency transceiver, the programmable processor is configured to use the communication circuitry to connect to a first wireless network via the radio frequency transceiver,
wherein the programmable processor is configured to alter a state of the light source based on first information received in first signals from the first wireless network,
wherein, when the oscillator circuit electrically couples the motion sensor to the radio frequency transceiver, the motion sensor is configured to detect a presence of motion in an area proximate to a location of the smart lightbulb, and
wherein, responsive to the motion sensor detecting the presence of the motion, the programmable processor is configured to direct the oscillator circuit to electrically couple the communication circuitry to the radio frequency transceiver, alter the state of the light source, and use the communication circuitry to broadcast second signals indicative of the presence of the motion over the first network.

9. The smart lightbulb of claim 8 wherein, when the radio frequency transceiver receives the first signals while the radio frequency transceiver is electrically coupled to the motion sensor, the oscillator circuit is configured to switch from electrically coupling the motion sensor to the radio frequency transceiver to electrically coupling the communication circuitry to the radio frequency transceiver.

10. The smart lightbulb of claim 8 wherein the programmable processor is configured to periodically direct the oscillator circuit to switch between electrically coupling the motion sensor to the radio frequency transceiver and electrically coupling the communication circuitry to the radio frequency transceiver.

11. The smart lightbulb of claim 8 wherein, when the oscillator circuit electrically couples the communication circuitry to the radio frequency transceiver, the programmable processor is configured to use the communication circuitry to create a second wireless network via the radio frequency transceiver,
wherein the programmable processor is configured to alter the state of the light source based on second information received in third signals from the second wireless network, and
wherein, responsive to the motion sensor detecting the presence of the motion, the programmable processor is configured to direct the oscillator circuit to electrically couple the communication circuitry to the radio frequency transceiver and use the communication circuitry to broadcast the second signals indicative of the presence of the motion over the second network.

12. The smart lightbulb of claim 11 wherein the programmable processor is configured to rebroadcast the third signals over the first network.

13. The smart lightbulb of claim 8 wherein the state of the light source comprises at least one of an on state, an off state, a constant brightness state of the light source, a constant color state of the light source, a strobing state of the light source, a periodic color changing state of the light source, or a periodic brightness changing state of the light source.

14. A method comprising:
providing a smart light bulb having a programmable processor coupled to a motion sensor, communication circuitry and a radio frequency transceiver;
establishing a connection to a first wireless network via the radio frequency transceiver;
detecting a presence of motion by the motion sensor in an area proximate to the smart lightbulb;
generating a first state of illumination for a light source in response to the motion sensor detecting the presence of the motion;
broadcasting signals indicative of the detection of the motion by the motion sensor over the first wireless network via the radio frequency transceiver; and
transmitting periodic commands from the programmable processor to an oscillator circuit of the smart lightbulb to direct the oscillator circuit to switch an electrical coupling with the radio frequency transceiver between a first electrical coupling between the radio frequency transceiver and the motion sensor and a second electrical coupling between the radio frequency transceiver and the communication circuitry.

15. The method of claim 14 further comprising:
receiving signals from the first wireless network via the radio frequency transceiver, the signals received from the first wireless network having information for generating the first state of illumination for the light source;
processing the information via the programmable processor; and
generating the first state of illumination for a light source of the smart lightbulb in response to the information received in the signals received via the radio frequency transceiver.

16. A method comprising:
providing a smart light bulb having a programmable processor coupled to a motion sensor, communication circuitry and a radio frequency transceiver;
establishing a connection to a first wireless network via the radio frequency transceiver;
detecting a presence of motion by the motion sensor in an area proximate to the smart lightbulb;
generating a first state of illumination for a light source in response to the motion sensor detecting the presence of the motion;
broadcasting signals indicative of the detection of the motion by the motion sensor over the first wireless network via the radio frequency transceiver;
directing an oscillator circuit of the smart lightbulb to switch an electrical coupling between the motion sensor and the radio frequency transceiver to establish an electrical coupling between the communication circuitry and the radio frequency transceiver; and establishing an electrical coupling between the communication circuitry and the radio frequency transceiver.

17. A method comprising:
providing a smart light bulb having a programmable processor coupled to a motion sensor, communication circuitry and a radio frequency transceiver;
establishing a connection to a first wireless network via the radio frequency transceiver;
detecting a presence of motion by the motion sensor in an area proximate to the smart lightbulb;
generating a first state of illumination for a light source in response to the motion sensor detecting the presence of the motion;
broadcasting signals indicative of the detection of the motion by the motion sensor over the first wireless network via the radio frequency transceiver;
directing an oscillator circuit of the smart lightbulb to switch an electrical coupling between the communication circuitry and the radio frequency transceiver to establish an electrical coupling between the motion sensor and the radio frequency transceiver; and
establishing an electrical coupling between the motion sensor and the radio frequency transceiver.

18. A method comprising:
providing a smart light bulb having a programmable processor coupled to a motion sensor, communication circuitry and a radio frequency transceiver;
establishing a connection to a first wireless network via the radio frequency transceiver;
detecting a presence of motion by the motion sensor in an area proximate to the smart lightbulb;
generating a first state of illumination for a light source in response to the motion sensor detecting the presence of the motion;
broadcasting signals indicative of the detection of the motion by the motion sensor over the first wireless network via the radio frequency transceiver;
creating a second wireless network via the radio frequency transceiver, the second wireless network being created by the programmable processor using the communication circuitry after the electrical coupling between the communication circuitry and the radio frequency transceiver is established;
generating a second state of illumination for the light source based on information received in signals received by the programmable processor from the second wireless network; and
broadcasting the signals indicative of the detection of the motion by the motion sensor via the radio frequency transceiver over the second network.

19. The method of claim 18 further comprising:
rebroadcasting the signals received from the second wireless network over the first wireless network.

* * * * *